（12） United States Patent
Socha et al.

(10) Patent No.: US 9,982,579 B2
(45) Date of Patent: May 29, 2018

(54) THERMALLY COMPLIANT HEATSHIELD

(71) Applicant: United Technologies Corporation, Hartford, CT (US)

(72) Inventors: Pawel Socha, Manchester, CT (US); Richard Joseph Bulkovitch, Amston, CT (US); Kelsey Honious, East Hartford, CT (US); Jonathan C Reuben, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 309 days.

(21) Appl. No.: 14/793,457

(22) Filed: Jul. 7, 2015

(65) Prior Publication Data
US 2017/0009620 A1 Jan. 12, 2017

(51) Int. Cl.
F01M 5/00 (2006.01)
F01M 11/02 (2006.01)
F02C 7/24 (2006.01)
F01D 9/02 (2006.01)
F01D 9/06 (2006.01)
F01D 25/18 (2006.01)
F01D 25/28 (2006.01)

(52) U.S. Cl.
CPC ............... F01M 5/002 (2013.01); F01D 9/02 (2013.01); F01D 9/065 (2013.01); F01D 25/18 (2013.01); F01D 25/28 (2013.01); F01M 11/02 (2013.01); F02C 7/24 (2013.01); F05D 2230/232 (2013.01); F05D 2240/15 (2013.01); Y02T 50/672 (2013.01)

(58) Field of Classification Search
CPC .......... F01M 5/002; F01M 11/02; F01D 9/02; F01D 9/065; F01D 25/18; F01D 25/28; F02C 7/24; F05D 2230/232; F05D 2240/15; Y02T 50/672
USPC ......................................................... 138/110
See application file for complete search history.

(56) References Cited

U.S. PATENT DOCUMENTS 5,598,696 A * 2/1997 Stotts ........................ F02C 7/22
60/740
7,686,131 B1 * 3/2010 Osterkamp ........... F01N 13/001
180/89.2

(Continued)

FOREIGN PATENT DOCUMENTS

| EP | 1209776 | 5/2002 |
| EP | 2366873 | 9/2011 |
| WO | 2011090788 | 7/2011 |

OTHER PUBLICATIONS

Extended European Search Report dated Nov. 28, 2016 in European Application No. 16178059.8.

Primary Examiner — Craig Schneider
Assistant Examiner — David Deal
(74) Attorney, Agent, or Firm — Snell & Wilmer L.L.P.

(57) ABSTRACT

A heat shield comprising a sidewall portion, a top portion, and a plurality of flexible tabs attached to the sidewall portion is described herein, in accordance with various embodiments. The top portion may comprise an aperture. The sidewall portion may extend at an angle between 80 degrees and 100 degrees from the top portion. The sidewall portion may bound a hexagonal void. The flexible tab may comprise an angle between 80 degrees and 100 degrees. The flexible tab may be fixed to the sidewall portion, wherein the flexible tab is configured to be attached to a fitting.

10 Claims, 7 Drawing Sheets

(56) References Cited

U.S. PATENT DOCUMENTS

| | | | |
|---|---|---|---|
| 7,775,047 B2* | 8/2010 | Fish | F02C 7/222 |
| | | | 60/739 |
| 7,938,371 B2* | 5/2011 | Oga | F16L 3/1025 |
| | | | 248/55 |
| 8,992,090 B1 | 3/2015 | Mills | |
| 2012/0287588 A1* | 11/2012 | Muterspaugh | H05K 9/006 |
| | | | 361/752 |

* cited by examiner

THERMALLY COMPLIANT HEATSHIELD

FIELD

This disclosure relates to a gas turbine engine, and more particularly to heat shields for oil tube fittings.

BACKGROUND

Engine oil tubes and fittings may be subjected to relatively high temperatures. Once subjected to excessive heating, oil may undergo coking. Oil coking may cause solid oil deposits to form within oil tubes, causing undesirable effects such as blocked passageways and filters.

SUMMARY

A heat shield is described herein, in accordance with various embodiments. A heat shield may comprise a top portion, the top portion comprising an aperture, a sidewall portion, the sidewall portion extending at an angle between 80 degrees and 100 degrees from the top portion, and a flexible tab. The flexible tab may comprise an angle between 80 degrees and 100 degrees. The flexible tab may be fixed to the sidewall portion. The flexible tab may be configured to be attached to a fitting, wherein said flexible tab is configured to flex in response to at least one of an increase and decrease in temperature. The sidewall portion may bound a void. In various embodiments, the heat shield may be configured to at least partially encase the fitting. In various embodiments, the heat shield may be configured to impede heat transfer between the fitting and surrounding air. In various embodiments, the sidewall portion of the heat shield and the fitting may be separated by a gap. In various embodiments, the flexible tab may comprise an aperture, wherein the flexible tab is configured to be attached to the fitting via the aperture via at least one of a weld, solder, or braze. In various embodiments, the flexible tab may comprise an aperture, wherein the flexible tab is configured to be attached to the fitting via a plug weld via the aperture. In various embodiments, the heat shield may comprise at least one of a nickel-chromium based alloy and a stainless steel.

An assembly is described herein, in accordance with various embodiments. An assembly may include an oil tube, a fitting, wherein the fitting is configured to be attached to the oil tube, and a heat shield, wherein the heat shield is configured to be attached to the fitting. The heat shield may comprise a top portion, the top portion comprising an aperture, a sidewall portion, the sidewall portion extending at an angle between 80 degrees and 100 degrees from the top portion, the sidewall portion bounding a void, and a flexible tab. The flexible tab may comprise an angle between 80 degrees and 100 degrees. The flexible tab may be fixed to the sidewall portion, wherein the flexible tab is configured to be attached to a fitting. In various embodiments, the flexible tab may be configured to flex in response to at least one of an increase and decrease in temperature. In various embodiments, the heat shield may be configured to at least partially encase the fitting. In various embodiments, the heat shield may be configured to prevent heat transfer between the fitting and surrounding air. In various embodiments, the sidewall portion and the fitting may be separated by a gap. In various embodiments, the tube may be a dual wall tube comprising an inner tube and an outer tube. In various embodiments, the sidewall portion may bound a hexagonal void. In various embodiments, the heat shield may be attached to the tube fitting via at least one of a plug weld and a fastener. In various embodiments, the heat shield may be manufactured via a brake bending process. In various embodiments, the heat shield may comprise at least one of a nickel-chromium based alloy and a stainless steel.

A method of cooling a tube fitting is disclosed herein, in accordance with various embodiments. The method of cooling a tube fitting may include forming a heat shield via a brake bending process, and coupling the heat shield to an outer surface of a tube fitting via a flexible tab, the heat shield at least partially encasing the tube fitting. The heat shield may comprise a top portion, a sidewall portion, and a flexible tab. The flexible tab may comprise an angle between 80 and 100 degrees. The flexible tab may be fixed to the sidewall portion. In various embodiments, the method may further comprise reflecting, by the heat shield, a heat wave away from the tube fitting. In various embodiments, the sidewall portion of the heat shield may be configured to be separated from the tube fitting by a gap.

Introducing a heat shield may prevent oil tube fittings from excessively heating, preventing oil coking.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
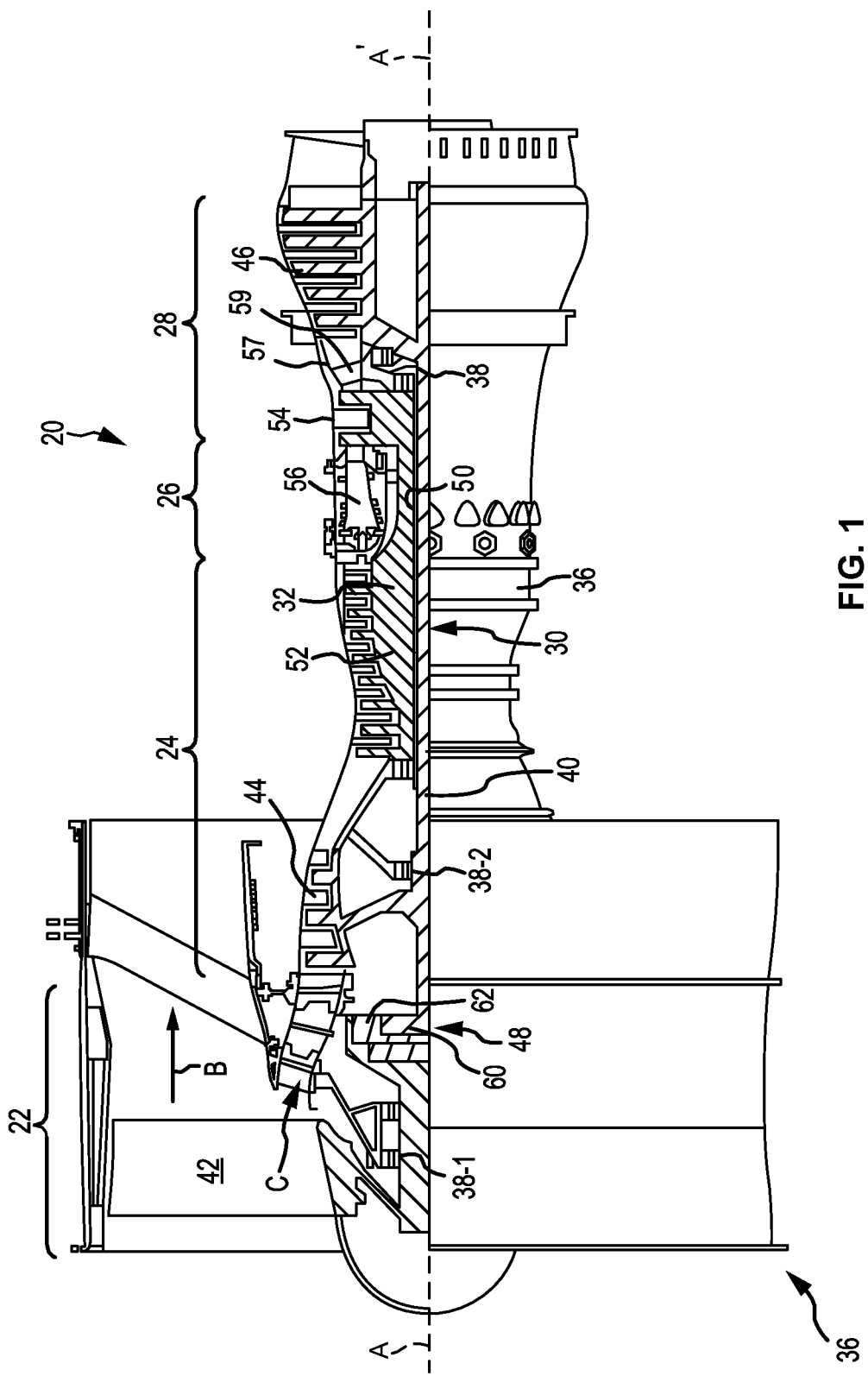
FIG. 1 illustrates an example gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of gas turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 (e.g., a second compressor section) and high pressure (or second) turbine section ("HPT") 54. A combustor 56 may be located between high pressure compressor 52 and HPT 54. A mid-turbine frame 57 of engine static structure 36 may be located generally between HPT 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over HPT 54 and low pressure turbine 46. Mid-turbine frame 57 includes airfoils 59 which are in the core airflow path. Low pressure turbine 46 and HPT 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

Figure 2A:
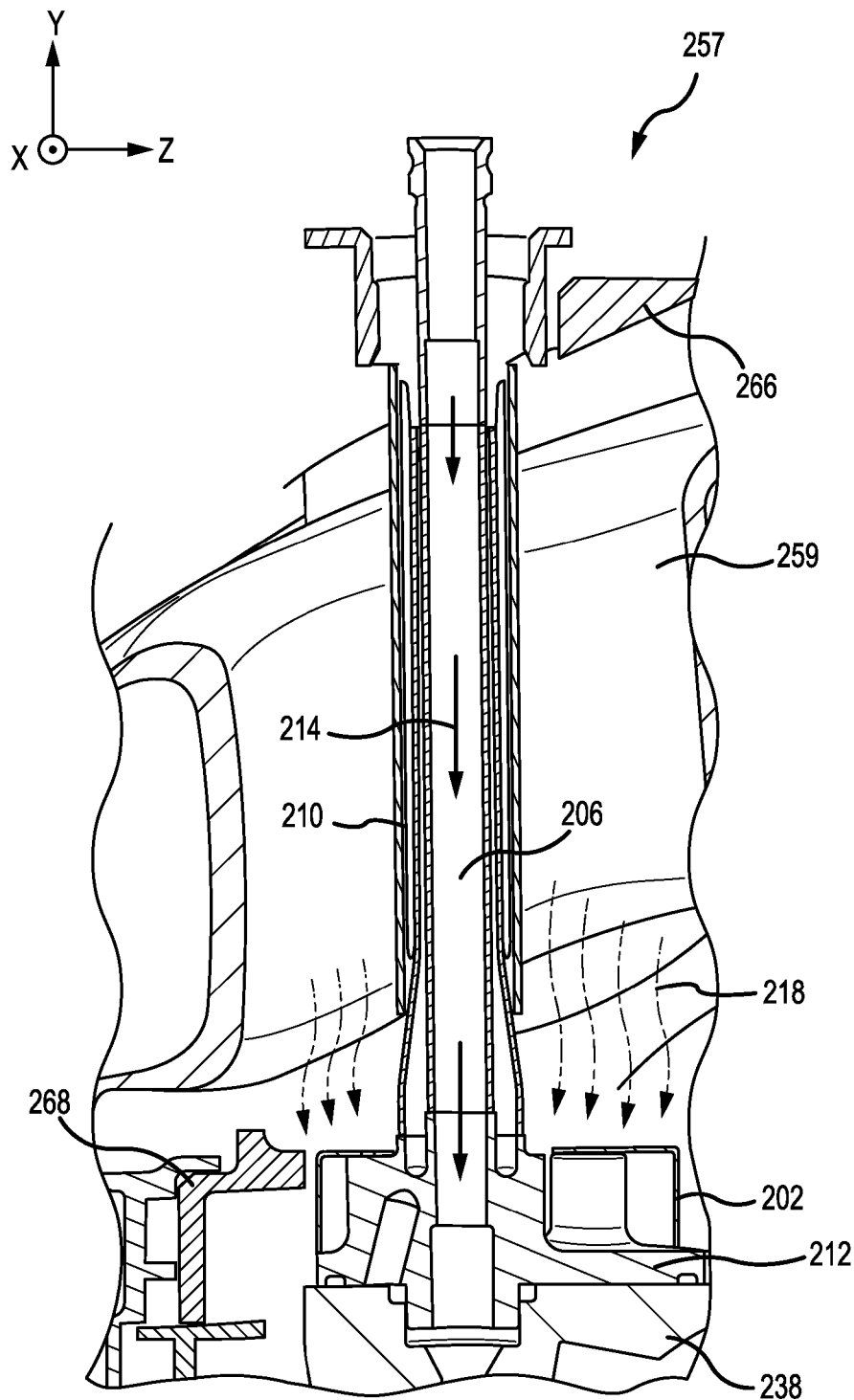
FIG. 2A illustrates a schematic view of an example mid-turbine frame assembly, in accordance with various embodiments.

In various embodiments, with reference to FIG. 2A, a mid-turbine frame (MTF) assembly is illustrated. An xyz coordinate axis is provided for ease of illustration. MTF assembly 257 may include bearing compartment 238, outer case 266, and inner case 268. MTF vane 259 may be located between inner case 268 and outer case 266. Oil tube fitting 212 may be attached to a portion of bearing compartment 238. Oil tube 206 may extend between outer case 266 and oil tube fitting 212. Oil 214 may be located within oil tube 206. Oil 214 may be used to lubricate at least a portion of bearing compartment 238. Oil tube 206 may be located at least partially within MTF vane 259. Sleeve 210 may encase at least a portion of oil tube 206. Oil tube fitting heat shield (also referred to herein as heat shield) 202 may be located between MTF vane 259 and oil tube fitting 212, whereby at least a portion of oil tube fitting 212 is located in the negative y-direction from heat shield 202 and at least a portion of MTF vane 259 is located in the positive y-direction from heat shield 202.

Hot exhaust may impinge on MTF vane 259 which may cause MTF vane 259 to increase in temperature due to convective heat transfer from the hot exhaust. The hot exhaust may be in the range from about 800° F. (427° C.) to about 1000° F. (538° C.) in one embodiment. Heat waves 218 may radiate from MTF vane 259. In various embodiments, heat waves may radiate to other nearby components which may cause the nearby components to increase in temperature. In return, the nearby components may transfer heat to other adjacent components and/or fluids. For example, heat waves may radiate from MTF vane 259 to oil tube 206 and may convectively transfer heat from MTF vane 259 to oil tube 206. Heat may be conductively transferred to oil located inside oil tube 206. Furthermore, when oil exceeds various threshold temperatures, it may undergo severe oxidative and thermal breakdown which may cause solid deposits to form. These deposits may be undesirable as they may impede the flow of fluid through various components including, for example, tubes and filters. Heat shield 202 may be configured to block heat waves 218 radiating from MTF vane 259 from directly impinging on oil tube fitting 212. Furthermore, heat shield 202 may help minimize convective heat transfer from hot air surrounding oil tube fitting 212. Accordingly, heat shield 202 may prevent heat from being transferred to oil tube fitting 212. In various embodiments, heat shield 202 may prevent oil from coking within oil tube fitting 212. Sleeve 210 may be configured to block radiating heat waves from MTF vane 259 from impinging on oil tube 206.

Figure 2B:
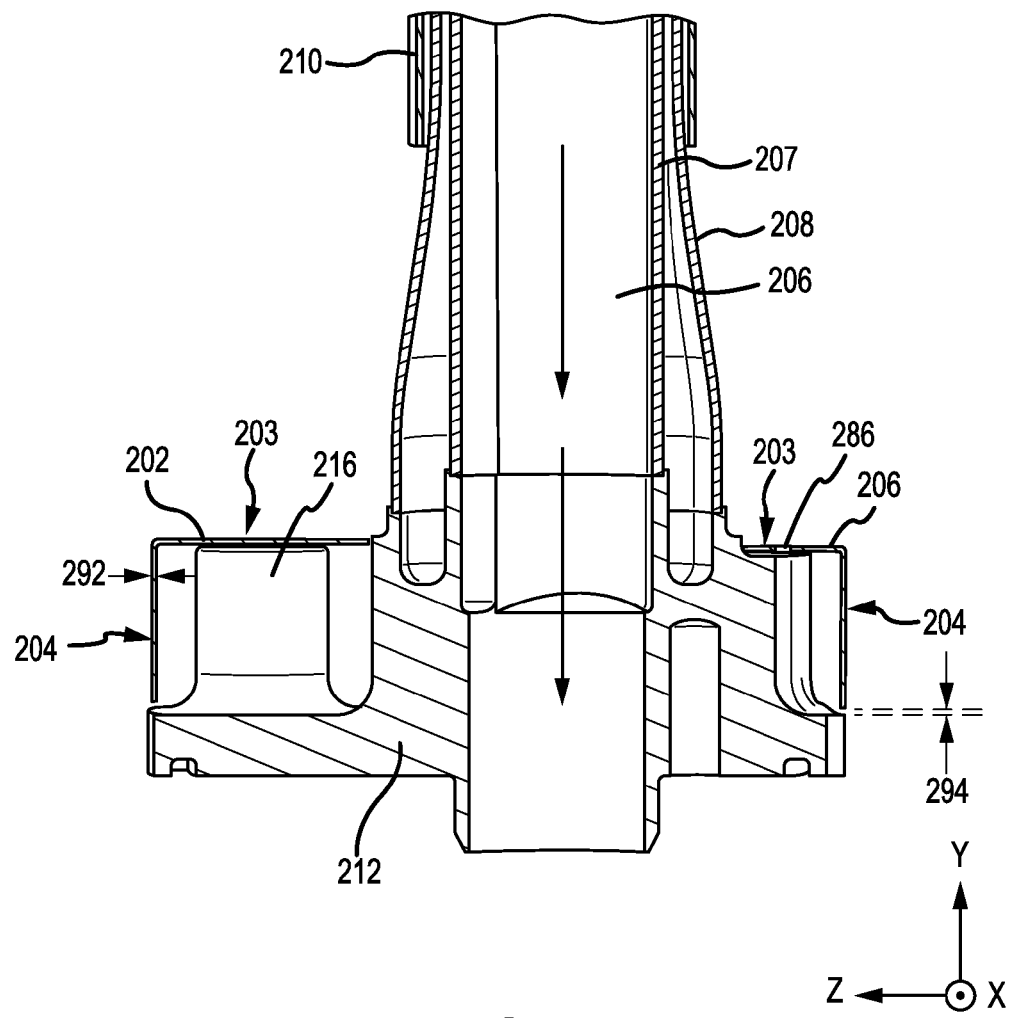
FIG. 2B illustrates a schematic view of an oil tube fitting heat shield assembly, in accordance with various embodiments.

In various embodiments, with reference to FIG. 2B, oil tube 206 may comprise an inner tube 207 and an outer tube 208. Accordingly, oil tube 206 may be referred to as a dual wall tube. Inner tube 207 may be enclosed by outer tube 208. There may be a space between inner tube 207 and outer tube 208 which may be occupied by air. The outer tube 208 may be configured to contain oil within outer tube 208 in the event that there is an oil leak from inner tube 207. Outer tube 208 may be configured to prevent heat transfer from surrounding hot air to inner tube 207. Oil tube 206 may be configured to attach to oil tube fitting 212. Oil tube 206 may be attached to oil tube fitting 212 via weld, solder, braze, or any other suitable method. Heat shield 202 may comprise a sidewall portion 204 and a top portion 203. Sidewall portion 204 of heat shield 202 may be configured to at least partially encase oil tube fitting 212. Top portion 203 of heat shield 202 may be configured to at least partially encase oil tube fitting 212. Accordingly, heat shield 202 may be configured to at least partially encase oil tube fitting 212. In various embodiments, sidewall portion 204 may extend in a direction that is normal to top portion 203. In various embodiments, sidewall portion 204 may extend at an angle between eighty degrees and one hundred degrees (80°-100°) from top portion 203. Accordingly, sidewall portion 204 and top portion 203 may form an angle between eighty degrees and one hundred degrees (80°-100°).

In various embodiments, oil tube fitting 212 may be separated from sidewall portion 204 of heat shield 202 by a gap 294. Heat shield 202 may be configured to be attached to oil tube fitting 212 such that there is a gap 294 between sidewall portion 204 of heat shield 202 and oil tube fitting 212. Sidewall portion 204 may be configured to be separated from oil tube fitting 212 by gap 294 such that a conductive thermal path does not exist between sidewall portion 204 and oil tube fitting 212. Gap 294 may be configured to be minimal while allowing thermal expansion of heat shield 202 and oil tube fitting 212 without creating a thermal conduction path between heat shield 202 and oil tube fitting 212. In various embodiments, gap 294 may comprise a distance in a range from about 0.1 millimeters to about 7 millimeters and in various embodiments, in a range from about 1 millimeter to about 4 millimeters and in various embodiments, gap 294 may comprise a distance of about 2 millimeters. Minimizing gap 294 may allow heat shield 202 to more effectively minimize convective heat transfer between oil tube fitting 212 and surrounding hot air. Minimizing gap 294 may allow heat shield 202 to more effectively minimize convective heat transfer between oil tube fitting 212 and radiated heat from an adjacent MTF vane. Gap 294 may be configured to prevent a thermal conduction path between sidewall portion 204 and oil tube fitting 212 during thermal expansion of oil tube fitting 212 and/or heat shield 202.

In various embodiments, various components of MTF assemblies may comprise various materials. Various components, including heat shield 202, may comprise a high temperature metal (e.g., an austenitic nickel-chromium-based alloy such as that available under the trade name INCONEL), a high temperature composite, and/or the like. In various embodiments, heat shield 202 may comprise a high temperature stainless steel (e.g., type 330 stainless steel).

Figure 3A:
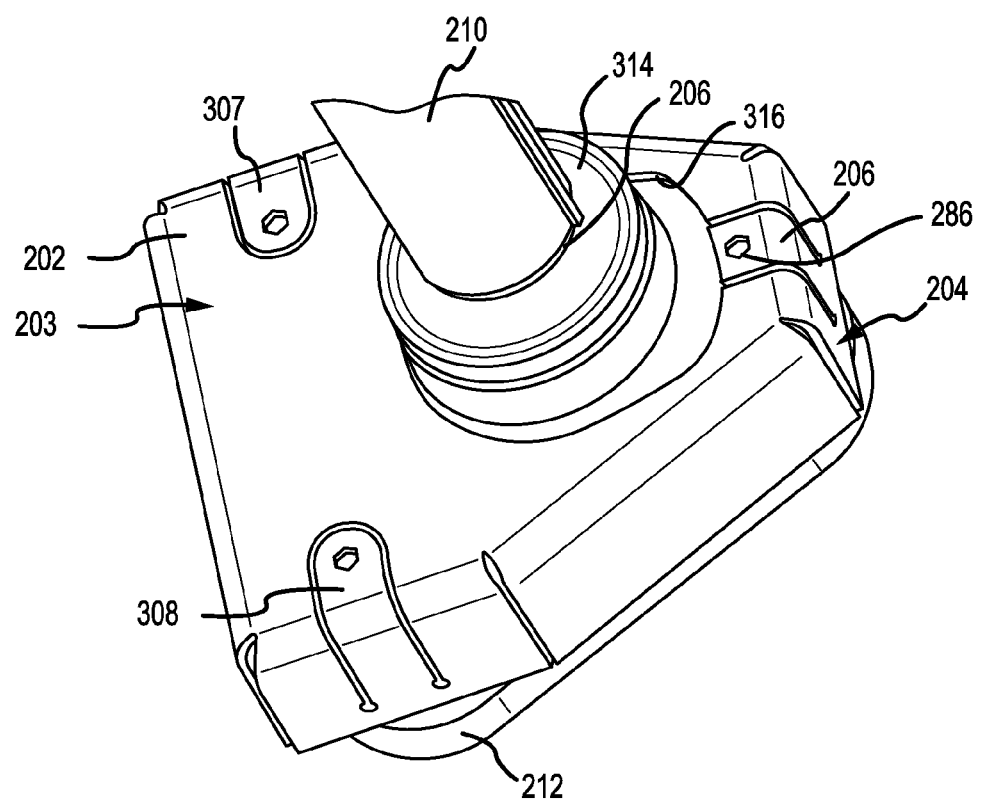
FIG. 3A illustrates a perspective view of an oil tube fitting heat shield assembly, in accordance with various embodiments.
Figure 3B:
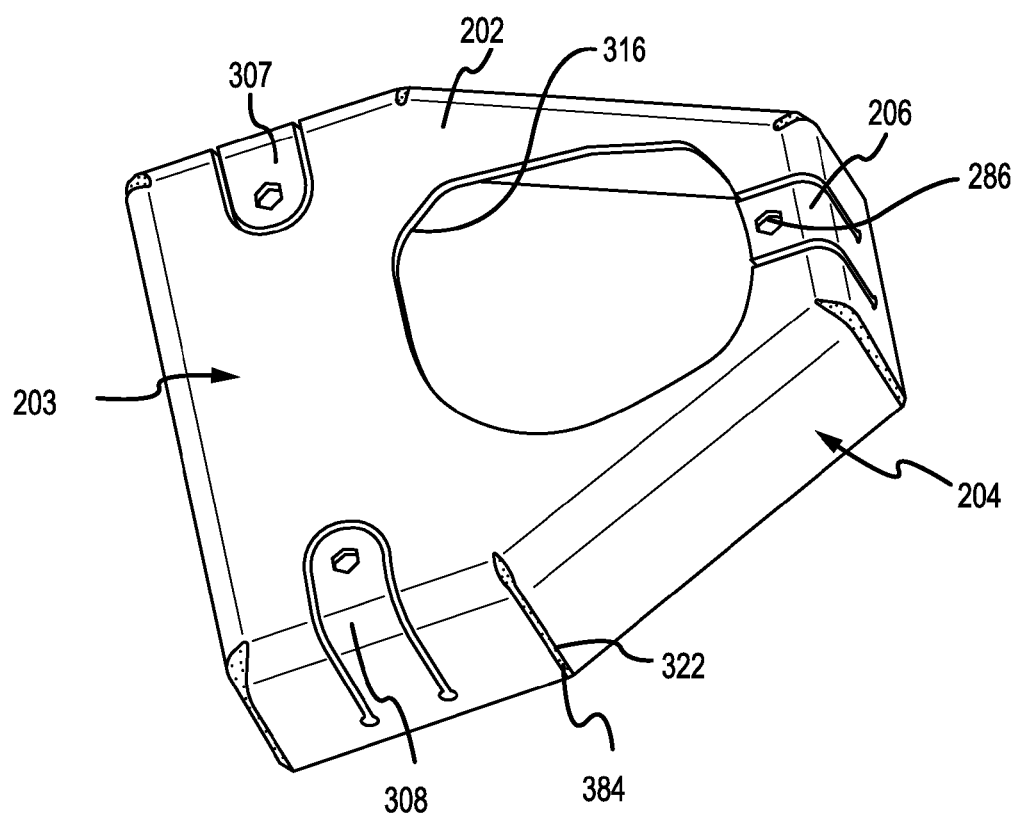
FIG. 3B illustrates a perspective view of an oil tube fitting heat shield, in accordance with various embodiments.

With reference to FIG. 3A and FIG. 3B, elements with like element numbering as depicted in FIG. 2A and FIG. 2B, are intended to be the same and will not be repeated for the sake of clarity.

In various embodiments, with reference to FIG. 2B and FIG. 3A, heat shield 202 may comprise flexible tab 206. Flexible tab 206 may be fixed to sidewall portion 204. Flexible tab 206 may comprise a right angle. Flexible tab 206 may comprise an angle between eighty degrees and one hundred degrees (80°-100°). The sidewall portion 204 of flexible tab 206 may extend in a direction that is normal to the top portion 203 of flexible tab 206. Flexible tab 206 may comprise aperture 286. In various embodiments, aperture 286 may be configured to accommodate a plug weld. In various embodiments, aperture 286 may be configured to accommodate a fastener. In various embodiments, top portion 203 of heat shield 202 may comprise aperture 316. Aperture 316 may be configured to allow fitting post 314 to be located within aperture 316 when in the installed position. Aperture 316 may be configured to be large enough to allow various components such as fittings attached to oil tube 206 to slide through aperture 316 in response to sliding heat shield 202 over oil tube 206 to an installed position.

In various embodiments, with reference to FIG. 3B, heat shield 202 may be manufactured via a sheet metal brake bending process. In various embodiments, a brake bending process may include a piece of sheet metal that is cut into a desired shape via a two-axis laser, water jet, or the like. Flexible tab 206, flexible tab 307, flexible tab 308, aperture 286, aperture 316, and any other apertures or features may also be cut into the sheet metal at this point. Next, the sheet metal may be bent along a straight line several times until the desired shape is formed, resulting in heat shield 202. Finally, the newly formed edges, such as edge 322 for example, may be welded together, via weld 384 for example, to fill the gap that may exist between the newly formed edges of sidewall portion 204. Accordingly, no gap In various embodiments, with reference now to FIG. 2B, heat shield 202 may comprise a wall thickness 292. In various embodiments, heat shield 202 may be manufactured via a hydro-forming process. Wall thickness 292 may be chosen according to various design considerations. In various embodiments, wall thickness 292 may be between 0.010 in (0.25 mm) and 0.030 in (0.76 mm) in thick. During manufacturing, sheet metal of a preferred wall thickness may be chosen to be hydro-formed to the desired heat shield geometry. For example, if a heat shield comprising a wall thickness of 0.5 mm is desired, a piece of sheet metal comprising a wall thickness of 0.5 mm may be used and formed into the desired geometry using high pressure hydraulic fluid to press the sheet metal into a die in a process known as hydro-forming. In various embodiments, a single piece of sheet metal may be hydro-formed into heat shield 202. In various embodiments, two or more pieces of sheet metal may be hydro-formed into different geometries and welded together to form heat shield 202.

With reference now to FIG. 2B and FIG. 3A, heat shield 202 may further comprise flexible tab 307 and flexible tab 308, according to various embodiments. Accordingly, heat shield 202 may comprise a plurality of flexible tabs. In various embodiments, flexible tab 307 and flexible tab 308 may be similar to flexible tab 206. In various embodiments, oil tube fitting 212 may comprise a plurality of attachment posts, such as attachment post 216, for example. In various embodiments, flexible tab 307 may be configured to be attached to attachment post 216. In various embodiments, flexible tab 308 may be similar to flexible tab 307. Flexible tab 308 may be configured to be attached to an attachment post located adjacent to attachment post 216.

Figure 4A:
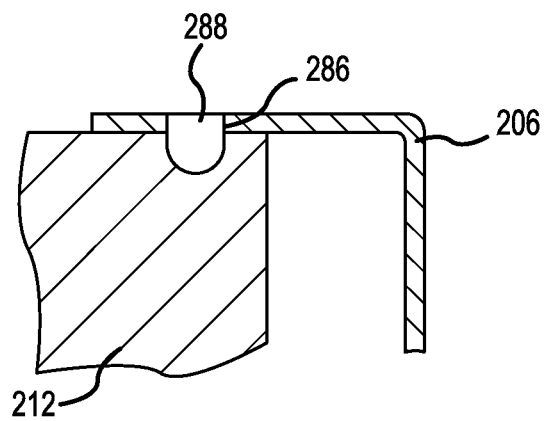
FIG. 4A illustrates a cross-section view of a heat shield attached to an oil tube fitting via a plug weld, in accordance with various embodiments.
Figure 4B:
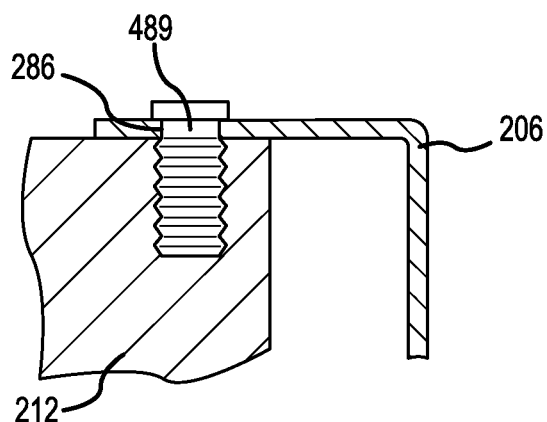
FIG. 4B illustrates a cross-section view of a heat shield attached to an oil tube fitting via a fastener, in accordance with various embodiments.

With reference to FIG. 4A and FIG. 4B, elements with like element numbering as depicted in FIG. 2A through FIG. 3B, are intended to be the same and will not be repeated for the sake of clarity.

With reference now to FIG. 4A, flexible tab 206 may be configured to attach to oil tube fitting 212. In various embodiments, flexible tab 206 may be configured to attach to oil tube fitting 212 via weld, solder, braze, or any other suitable method. In various embodiments, flexible tab 206 may be configured to attach to oil tube 206 via a plug weld 288. In various embodiments, flexible tab 206 may be attached to oil tube fitting 212, whereby a plug weld 288 is applied into aperture 286, thereby attaching flexible tab 206 to oil tube fitting 212.

With reference now to FIG. 4B, flexible tab 206 may be configured to attach to oil tube fitting 212 via a fastener 489, such as a screw or a bolt for example. In various embodiments, fastener 489 may be inserted into aperture 286 and threadingly attach to oil tube fitting 212, thereby attaching flexible tab 206 to oil tube fitting 212.

In various embodiments, with further reference to FIG. 2B and FIG. 3A, flexible tab 307 may be attached to oil tube fitting 212 via attachment post 216 in a similar manner as flexible tab 206. Flexible tab 308 may be attached to oil tube fitting 212 in a similar manner as flexible tab 307. In various embodiments, flexible tab 206, flexible tab 307, and flexible tab 308 may be configured to flex or bend relative to heat shield 202 during thermal expansion and/or contraction of oil tube fitting 212 and/or heat shield 202, thereby preventing heat shield 202 from bending or distorting during such event. Accordingly, flexible tabs 206, 307, and 308 may prevent heat shield 202 from cracking or breaking during operation, thus preventing cooling efficiency of heat shield 202 from decreasing during a thermal expansion and/or contraction event. Accordingly, flexible tabs 206, 307, and 308 may be configured to flex in response to an increase and/or decrease in temperature.

In various embodiments, the sidewall portion 204 of heat shield 202 may comprise a hexagonal geometry. For example, FIG. 3B illustrates the sidewall portion 204 of heat shield 202, wherein the sidewall portion 204 bounds a hexagonal void. In various embodiments, the sidewall portion 204 of heat shield 202 may comprise one of a square, rectangular, pentagon, heptagon, octagon, oblong, round, elliptical, or any other geometry. The geometry of the sidewall portion 204 of heat shield 202 may be driven by the geometry of oil tube fitting 212. Accordingly, the geometry of oil tube fitting 212 and sidewall portion 204 may be complementary.

Figure 5:
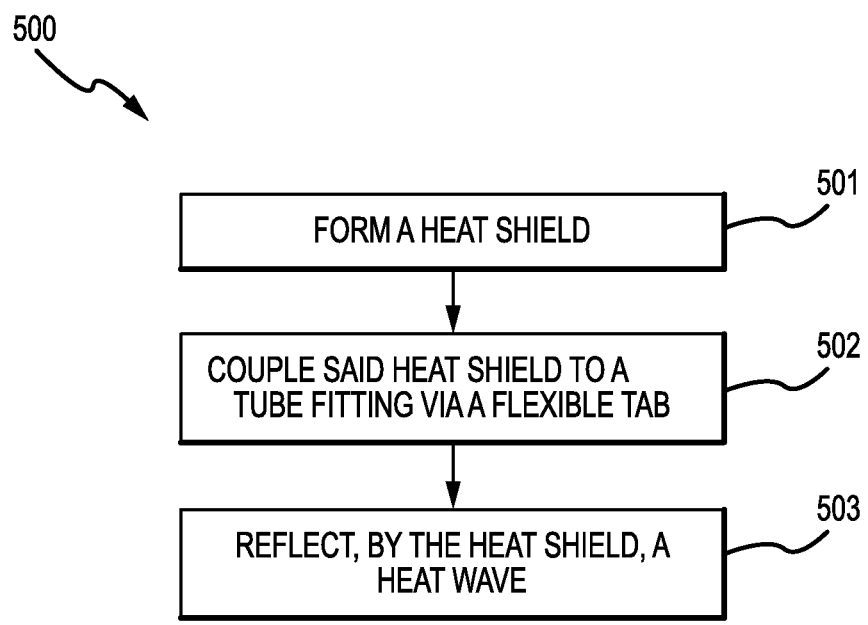
FIG. 5 illustrates a method of cooling an oil tube fitting, in accordance with various embodiments.

With reference to FIG. 5, a method 500 of cooling a tube fitting is disclosed herein, in accordance with various embodiments. The method 500 of cooling a tube fitting may include forming a heat shield in step 501. Step 502 may include coupling said heat shield to a tube fitting via a flexible tab. Step 503 may include reflecting, by the heat shield, a heat wave. With further reference to FIG. 2A and FIG. 3A, step 501 may include forming heat shield 202 via the brake bending process as described herein. Step 502 may include coupling heat shield 202 to an outer surface of oil tube fitting 212 via flexible tab 206, 307, and/or 308. Heat shield 202 may at least partially encase oil tube fitting 212. Step 503 may include reflecting, by heat shield 202, a heat wave 218 away from oil tube fitting 212.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An assembly comprising:
   a tube,
   a fitting configured to be attached to the tube; and
   a heat shield configured to be attached to the fitting, wherein the heat shield comprises:
   a top portion comprising an aperture;
   a sidewall portion extending at an angle between 80 and 100 degrees from the top portion, the sidewall portion bounding a void; and
   a flexible tab cut into the top portion and the sidewall portion, the sidewall portion of the flexible tab extending at an angle between 80 and 100 degrees from the top portion of the flexible tab, the flexible tab being fixed to the sidewall portion, wherein the flexible tab is configured to be attached to the fitting.

2. The assembly of claim 1, wherein the flexible tab is configured to flex in response to at least one of an increase and decrease in temperature.

3. The assembly of claim 1, wherein the heat shield is configured to at least partially encase the fitting.

4. The assembly of claim 3, wherein the heat shield is configured to prevent heat transfer between the fitting and surrounding air.

5. The assembly of claim 3, wherein the sidewall portion and the fitting are separated by a gap.

6. The assembly of claim 1, wherein the tube is a dual wall tube comprising an inner tube and an outer tube.

7. The assembly of claim 6, wherein the heat shield is attached to the tube fitting via at least one of a plug weld or a fastener.

8. The assembly of claim 1, wherein the sidewall portion bounds a hexagonal void.

9. The assembly of claim 1, wherein the heat shield is manufactured via a brake bending process.

10. The assembly of claim 1, wherein the heat shield comprises at least one of a nickel-chromium based alloy and a stainless steel.

* * * * *